United States Patent [19]

Perkins, Jr. et al.

[11] Patent Number: 4,661,304
[45] Date of Patent: Apr. 28, 1987

[54] RESONANT-CAVITY ANTENNA FOR PLASMA HEATING

[75] Inventors: Francis W. Perkins, Jr., Princeton, N.J.; Shiu-Chu Chiu; Paul Parks, both of San Diego, Calif.; John M. Rawls, Del Mar, Calif.

[73] Assignee: The United States of America as represented by the United States Department of Energy, Washington, D.C.

[21] Appl. No.: 569,701

[22] Filed: Jan. 10, 1984

[51] Int. Cl.$^4$ .................................................. G21B 1/00
[52] U.S. Cl. ..................................... 376/123; 376/132
[58] Field of Search ........... 376/121, 123, 131, 132 O, 376/133; 219/121 P

[56] References Cited

U.S. PATENT DOCUMENTS

| 3,174,068 | 3/1965 | Leboutet et al. | 376/132 |
| 4,110,595 | 8/1978 | Brambilla et al. | 376/132 |
| 4,425,295 | 1/1984 | Fisch et al. | 376/132 |
| 4,511,782 | 4/1985 | Motley et al. | 376/133 |

FOREIGN PATENT DOCUMENTS 841567  4/1982  U.S.S.R. ............................... 376/132

OTHER PUBLICATIONS

Elet et al., "ICRF Antenna Coupling Studies", General Atomic Project 3235, Aug. 1982.
Stevens et al., "Lower Hybrid Heating and Current Drive on PLT", PPPL-1977, Mar. 1983.
Perkins et al., "A Resonant Cavity ICRF Coupler for Large Tokamaks", PPPL-2000, Apr. 1983.
Hwang et al., "Modeling of ICRF Heating of a Tokamak Plasma", PPPL-1990, May 1983.

Primary Examiner—Deborah L. Kyle
Assistant Examiner—Richard L. Klein
Attorney, Agent, or Firm—Bruce R. Mansfield; Gustavo Siller, Jr.; Judson R. Hightower

[57] ABSTRACT

Disclosed is a resonant coil cavity wave launcher for energizing a plasma immersed in a magnetic field. Energization includes launching fast Alfven waves to excite ion cyclotron frequency resonances in the plasma. The cavity includes inductive and capacitive reactive members spaced no further than one-quarter wavelength from a first wall confinement chamber of the plasma. The cavity wave launcher is energized by connection to a waveguide or transmission line carrying forward power from a remote radio frequency energy source.

28 Claims, 18 Drawing Figures

RESONANT-CAVITY ANTENNA FOR PLASMA HEATING

CONTRACTUAL ORIGIN OF THE INVENTION

The U.S. Government has rights in this invention pursuant to Contract No. DE-AC02-76CH03073 between the U.S. Department of Energy and Princeton University, and pursuant to Contract No. DE-AT03-76ET51011 between DOE and G. A. Technologies, Inc.

BACKGROUND OF THE INVENTION

This invention relates generally to a method and apparatus for transferring energy to a plasma immersed in a magnetic field, and relates particularly to an apparatus for heating a plasma of low atomic number ions to high temperatures by transfer of energy to plasma resonances, particularly the fundamental and harmonics of the ion cyclotron frequency of the plasma ions. This invention transfers energy from an oscillating radio-frequency field to a plasma resonance of a plasma immersed in a magnetic field.

Research devices have been devised for studying the properties of high temperature plasmas, and for the production therein of thermonuclear ractions. In such devices, it is necessary that the plasma, a gas comprising approximately equal numbers of positively charged ions and free electrons, be raised to a high temperature.

One general type of device for plasma confinement, the Tokamak, comprises an endless, closed tube, such as a toroid, with a geometrically co-extensive, externally imposed magnetic field (e.g., a toroidal magnetic field) in which magnetic lines of induction extend around the toroid generally parallel to its minor axis. Such a magnetic field is conventionally provided by electrical currents in one or more conductive coils encircling the minor axis of the toroid. The combination of a poloidal magnetic field produced by the plasma current, with the toroidal magnetic field produced by the toroidal coil current, is suitable for providing helix-like magnetic field lines that generally lie on closed, nested magnetic surfaces. The plasma is accordingly subjected to confining, constricting forces generated at least in part, by the current flowing in the plasma. The resulting magnetic field provides for a diffused pinching in the confining magnetic field which may be substantially greater than the outward pressure of the plasma.

The steady state operation of toroidal plasma systems is a recognized goal in the development of plasma technology, and substantial effort has been directed to non-inductive plasma current forming and heating methods which might provide the capability for steady-state operation. Techniques currently being considered for providing auxiliary heating in toroidal plasma apparatus include high energy neutral beam injection, radio frequency wave heating, adiabatic compression, and several other less developed techniques including relativistic electron beam injection, cluster injection, plasma-gun injection, and laser-pellet hot plasma formation. This invention is directed to radio frequency wave heating.

The excitation and damping of waves is a heating method similar in many ways to the injection and thermalization of energetic ions; the efficiencies of power transfer to the plasma are at least roughly comparable. Wave heating has an advantage of relatively rapid thermalization of the wave energy; this means that the energy density of the waves in the plasma can remain small compared with the plasma thermal energy density. If the high energetic-ion pressures associated with neutral-beam heating were to give rise to problems of equilibrium or stability, wave heating might circumvent these problems. In hot dense plasmas, the closest rival method, neutral beam injection, requires very high beam energies if power is to be deposited deep in the plasma interior. Attention is therefore being directed to wave heating techniques.

Due to long-range electromagnetic interactions between charged particles and external electromagnetic fields, there exists a host of collective motions (waves) the plasma (see for example. T. H. Stix, "The Theory of Plasma Waves", McGraw-Hill, New York (1962). The existence of these waves provides a means for coupling of external electromagnetic energy such as radio frequency (r-f) electromagnetic wave energy into the plasma. With conventional vacuum vessels, an rf antenna coil generates an oscillating magnetic field at the edge of the plasma. The oscillating magnetic field causes a fast magnetosonic wave to be formed in the plasma. When the frequency of this wave matches the ion cyclotron frequency (or a multiple of that frequency), the wave will be damped by the plasma particles. The wave will transfer its energy to the ions, causing them to spiral at a faster velocity and in a helical path of greater radius. Through collisions with other plasma particles, these more energetic ions will transfer their energy to other plasma particles, thus heating the plasma. The ion cyclotron range of frequencies is about 10 MHz to 200 MHz in present devices. Plasma waves which may have utilization in respect to plasma heating, in ascending frequency, are: Alfven waves, ion cyclotron waves, lower hybrid waves, and electron cyclotron waves.

In connection with Alfven wave heating i.e., for frequencies below the io cyclotron frequency, $<c_i$, there are two modes of heating:

$$\omega^2 = k_{||}^2 V_A^2$$

$$\omega^2 = k^2 V_A^2.$$

For typical fusion grade plasmas, the frequency of the first mode of the shear Alfven wave is less than 1.0 MHz and the vacuum wave length, $2\pi/k_{||}$ is the order of several meters. Disadvantages of conventional Alfven wave utilization include the requirement for protection and cooling of the coils within the metallic vessel, and possible large impurity production. Furthermore, because the frequency range is below the ion cyclotron frequency range, Alfven wave excitation may include enhanced plasma loss. Conventional Alfven wave heating techniques have not been thoroughly tested on tokamaks, although low-power experiments have been conducted.

As the excitation frequency, $\omega$ approaches the ion cyclotron frequency $\omega_{ci}$, the shear Alfven wave becomes an ion cyclotron wave with frequency $\omega_{ci}$. The term "ion cyclotron wave" refers to a natural oscillation or wave in a plasma which is immersed in a confining magnetic field, where the motion of the plasma ions taking part in the natural oscillation or wave is primarily transverse to the lines of force of the confining magnetic field, where the wave length (measured along a line of force) is relatively short, and where the frequency is slightly below the ion cyclotron frequency for the ions. Plasma heating in tokamaks by means of fast Alfven waves in the Ion-Cyclotron Range of Frequencies (ICRF) has achieved notable experimental successes which are understood in terms of theory. As a result, ICRF plasma heating has become the preferred option for heating first-generation tokamak reactors to ignition. (W. M. Stacey et al., U.S. FED-INTOR Activity and U.S. Contribution to the International Tokamak Reactor Phase-2A Workshop," Georgia Institute of Technology Report USA FED-INTOR/82-1 (1982); P. H. Rebut, "JET Joint Undertaking: March 1982," in Proceedings of the Third Joint Varenna-Grenoble International Symposium Heating in Toroidal Plasmas, Grenoble, 1982, Vol. III, pp. 989–998).

In all the experiments to date, the couplers (i.e., the antennas) which radiate the fast Alfven waves into the plasma have been induction loops located within the vacuum vessel. In addition, the coupling loops in the PLT tokamak are covered with a ceramic insulator. Such antennas are unsatisfactory for use in a fusion reactor, where engineering considerations require a modular, easily replaced antenna. The potential radiation damage to insulators from fusion neutrons calls for an all-metal coupler design, D. Q. Hwang, G. Grotz, and J. C. Hosea, "Surface Physics Problems During CRF Heating of Tokamak Plasma," J. Vac. Sci. Technol. 20, 1273 (1982). Further, the launching coils may perhaps be a significant source of plasma impurities. This is a drawback in high-powered present day experiments, and will become more so in an operating tokamak reactor environment. Also, difficulties arise since the loop antenna is directly fed through a transmission line, and the large inductance of the loop causes high voltages at the vacuum feed throughs. This in turn, imposes a serious limitation on the power handling capability of the coupler.

Waveguide wave lauchers are conceptually more desirable, but in practice, waveguide approaches are found to launch spectra that are far from optimal. One common antenna (or coupler) in use today is the box-type cavity which includes radiator members having a length approximately equal to one-half the free space wavelength of the rf output of the radio frequency generator driving the cavity. In many applications, resonators of this type are too bulky, and are difficult to service in a working machine. Due to limited availability of space on research plasma devices, and an expected similar limitation on operational fusion reactors, it is desirable to provide a launcher arrangement which is as small as possible, especially in the poloidal direction.

Given the present state of the art, practical coupler designs must be proved on research devices such as the "Big-Dee" Doublet III, JET and TFTR tokamaks. These tokamaks have magnetic field strengths that are the same as (or smaller than) the fields envisioned for a reactor. Since most reactor ICRF heating schemes utilize second harmonic heating, the impressed frequencies are similar in reactor and research tokamaks, while the actual size of a research tokamak is roughly a factor-of-two smaller than that of a fusion reactor. Resonant cavities must be able to accomomodate the smaller research tokamaks with no change in their basic configurations.

It is therefore an object of the present invention to provide a resonant cavity launcher that is much shorter in the polodial direction than arrangements presently available.

Current estimates of energy levels needed for successful higher-density reactor operations requires still higher wave coupling efficiencies than those presently available. The primary role that ICRF heating will play in the tokamak reactor will be in the heating of the plasma at the fundamental and second harmonic regimes. For the first commercial-scale fusion reactor, the mode of heating will require rf power levels in the 100 megawatt range. At the present time, existing rf systems for plasma machines are capable of delivering only 5 megawatts. It is therefore an object of the present invention to provide an rf launcher system that efficiently couples greater levels of rf energy to the plasma at the ion-cyclotron resonant frequency. More specifically, it is another object of the present invention to provide a resonant cavity antenna which provides an orientation of the confinement and radiating magnetic fields to effectively radiate fast Alfven waves.

A related object of the present invention is to provide a higher-power resonant cavity launcher of more compact size, and which operates at a substantially higher power flux than previous antenna designs. A high power flux ($\sim 10$ kW/cm$^2$) is desirable in a reactor to reduce the fraction of the wall area devoted to heating.

Another object of the present invention is to provide within the resonant cavity antenna, magnetic insulation in the regions of high energy electric fields. More specifically, it is an object of the present invention to provide a coupler which impresses oscillating magnetic fields having a strong toroidal component, on the plasma, and to have the strong electric field associated with the high Q antenna circuit directed orthogonal to a main toroidal magnetic field of the plasma confinement device, to thereby provide the magnetic insulation effect required to achieve higher voltage breakdown conditions.

It is another object of the present invention to provide an arrangement for launching fast Alfven waves which circumvents impurity problems by avoiding an intrusion into the vacuum vessel, beyond the first wall.

SUMMARY

A resonant coil cavity launches fast Alfven waves for efficient coupling to plasmas which are immersed in a strong magnetic field. The cavity includes frequency-determining reactive circuit components which are located within a one-quarter wavelength of the plasma containment chamber. Waves launched by the cavity energize plasma components within the Ion-Cyclotron Range of Frequencies. The strong electric fields associated with the reactive energy are entirely contained within the cavity, and are oriented perpendicular to the strong magnetic field surrounding the plasma.

A first embodiment of the present invention is comprised of first and second chambers. The first chamber contains a vertical current rod having two ends. One of which is joined to a wall of the first chamber. The second chamber contains a horizontally directed capacitor plate which is joined to the other end of the current rod. A portion of the current rod, adjacent the other end, penetrates the second chamber through an elongated wall which is common to the first and second chambers. A capacitive gap is formed between the horizontal plate and the common wall.

A second embodiment of the present invention comprises a single chamber having two parallel spaced-apart plates joined to a first wall of the chamber. A third plate is parallel to, and interposed between the first two plates. The third plate is joined to another, opposing wall of the chamber. Capacitive gaps are formed between the first and third plates and between the second and third plates.

In a third embodiment of the present invention two coextensive, overlying spaced-apart plates are mounted within a plasma chamber. The plates are joined together at one end to a first end wall. A second endwall is joined to the plates and to the chamber wall. A capacitive gap is formed between the chamber wall and the plates positioned adjacent thereto. A second gap is formed between the two plates.

In each embodiment, the cavity is oriented such that the plates are tangential to the strong magnetic field, so as to take advantage of the resulting magnetic insulation effect. Also, in each embodiment, the reactive circuit elements of the cavity are spaced no further than one-quarter wavelength from the plasma containment vessel. Correspondingly, all other dimensions of the cavity are less than one-quarter wavelength.

BRIEF DESCRIPTION OF THE DRAWINGS

In the drawings, wherein like elements are referenced alike:

FIG. 11 is a side elevational view, while the FIGS. 12 and 13 plane views.

DETAILED DESCRIPTION OF THE DRAWINGS

This invention relates generally to an apparatus for transforming energy to a plasma immersed in a magnetic field, and relates particularly to an apparatus for heating a plasma to high temperatures by transferring energy from a resonating field to a plasma at a plasma resonance. These techniques are becoming increasingly important due to the inherent limitations of ohmic and other plasma heating methods.

Very early in the magnetic fusion research program, Thomas Stix recognized that the resonances between the natural cyclotron motion of an ion and an electromagnetic wave so the same frequency offered an attractive approach to plasma heating. Today, Ion Cyclotron Resonance Heating (ICRH) via electromagnetic waves in the Ion Cyclotron Range of Frequencies (ICRF), is the preferred bulk method of heating reactor-grade tokamak plasmas. Utilizing ICRF techniques, high levels of radio frequency power can be generated in a non-radioactive environment remote from the tokamak reactor and carried to the reactor by standard coaxial transmission lines. The present invention provides an all-metal radiating structure, which is easily bolted onto a rectangular part opening in the first wall of a tokamak. As will be apparent to those skilled in the art, the present invention also finds application in areas outside of the fusion reactor environment.

Figure 1:
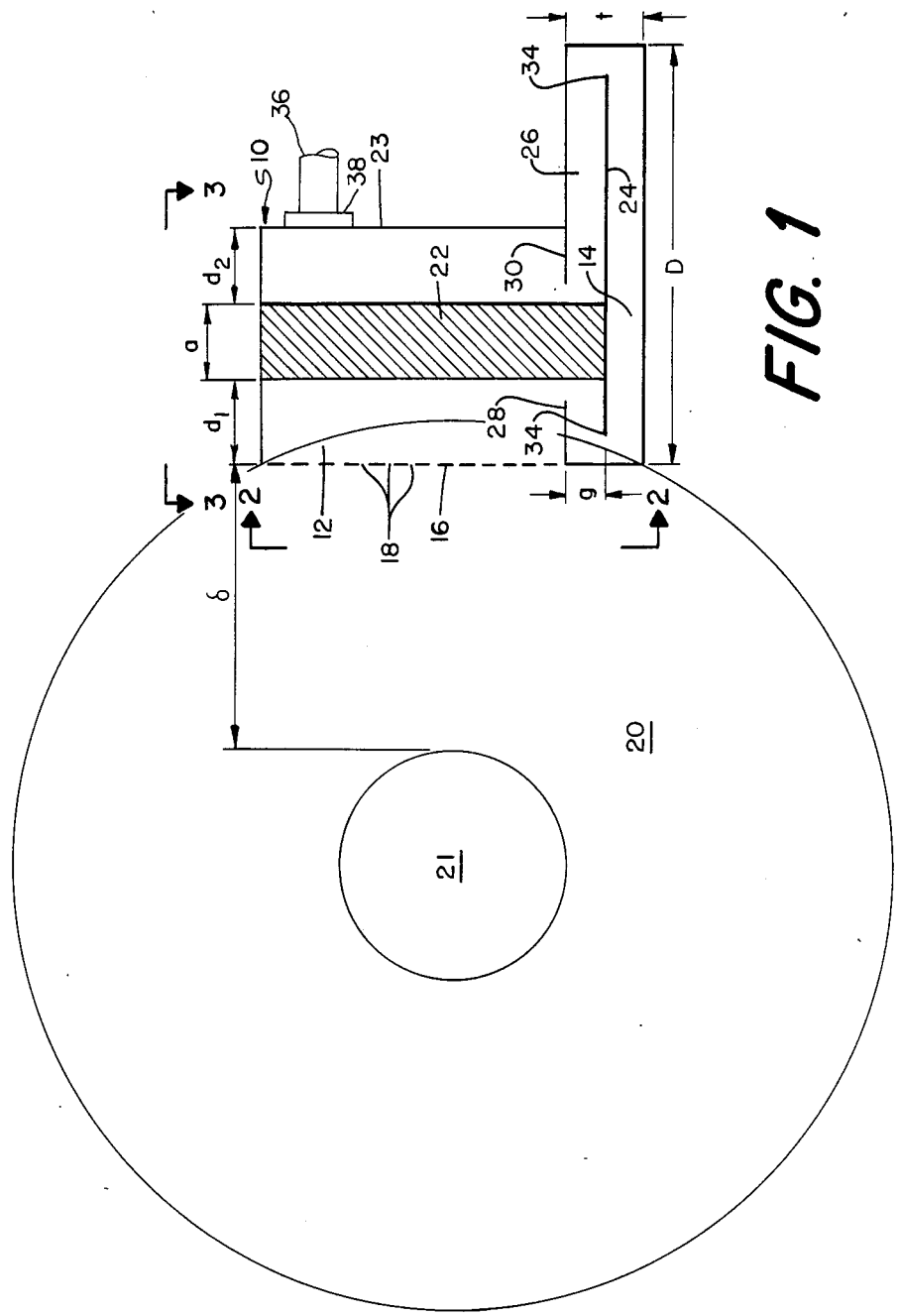
FIGS. 1-3 are side elevational, front elevational and plan views of a resonant cavity according to the invention, having a horizontal plate capacitor.

Referring now to the drawings, and especially to FIG. 1, a resonant coil cavity 10 has an upper chamber 12 which mainly acts as an inductor, and a lower chamber 14 which acts as a capacitor. In the side 16 facing the plasma, horizontally aligned apertures 18 achieve the effect of a Faraday shield, allowing radiation of the desired polarization to penetrate into a plasma chamber 20.

Plasma chamber 20 contains a high temperature plasma 21 surrounded by a magnetic field. In one particular application, for example, the present invention is directed to a magnetically confined reactor grade plasma, wherein chamber 20 comprises the first wall of a tokamak device.

The mode structure is easily visualized by regarding cavity 10 as a coaxial transmission line shorted at the top and terminated at the bottom by a capacitor. The resonance condition is then approximately $$\omega^2(\tan kh/kh) = (1/LC), \tag{1}$$

where k is the wave number of propagation along the upper chamber 12, h is the height of the coil cavity, L is the inductance of the upper chamber 12, and C is the capacitance of the lower chamber 14. When the side 16 of cavity 12 is closed, k becomes the free space wave number $k_o$ and L is obtained from the two-dimensional Laplace equation of the cavity. When the apertures 18 are opened, $L = L'$, the inductance of an enlarged cavity including a vacuum volume between the cavity opening and the plasma edge. Furthermore, $k > k_v$, or approximately $k = \omega(L'C_o)^{\frac{1}{2}}/h$, where $C_o$ is the capacitance of the original upper cavity.

Figure 3:
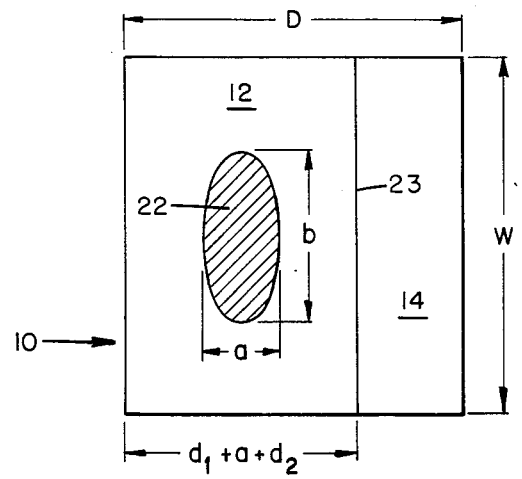

Upper chamber 12 includes a vertically-oriented central current rod 22 which is joined at its upper end to the ceiling wall of chamber 12. As can be seen in FIG. 3, current rod 22 is elliptical in cross section, having major and minor diameters b, a, respectively. Although an elliptical cross-section was chosen for the preferred embodiment, current rod 22 may take on any other convenient shape. Current rod 22, which forms an inductive element, is spaced a distance $d_1$, from the front of cavity 10, and distance $d_2$ is the distance from the rod to the back wall 23 of the cavity.

A horizontal capacitor plate 24, located in lower chamber 14, is affixed to the lower end of rod 22 by silver solder or any other suitable technique. Rod 22 is comprised of low resistivity metal, such as copper, and plate 24 is a sheet of similar low resistivity metal. Lower section 14 has a height t and depth D. Capacitor plate 24 is spaced a distance g from the partial upper wall portions 28, 30 of cavity 14 so as to form a gap 26. As will be explained below, cavity 10 is energized by waveguides or transmission lines 36 which terminate at the back wall 23 and are coupled to cavity 10 by coupling means 38. Coupling means 38 and transmission line 36 are shown schematically in FIG. 1 and are discussed in more detail below. It can thus be seen that cavity 10 comprises an antenna containing lumped inductive and capacitive circuit elements which, as will be explained, are located in close proximity to the plasma, wherein distance $d_1$ is much less than one-quarter wavelength. In contrast to $d_1$, D is larger, but is still less than one-quarter wavelength. In fact, all outer dimensions of the resonant cavity are less than one-quarter wavelength.

For a rectangular cavity, such as cavity 12, the inductance is given by $$L = (\mu_0 h/2\pi)\, \alpha, \tag{2}$$

where $$\alpha = \operatorname{Re} \ln \frac{w(\zeta) - w(\zeta_o{}^*)}{w(\zeta) - w(\zeta_o)}. \tag{3}$$

Here, $\zeta = x + iy$ is the coordinate of the boundary of the center rod 22 (which is shaped such that $\alpha$ is a constant) and $\zeta_o$ is the position of the current source, assumed here to be at the center of cavity section 12. The function w is related to the elliptic function $$w(\zeta) = sn^2\left(\frac{K\zeta}{b}, k\right), \tag{4}$$

where K(k) is the complete elliptic integral of the first kind, and the ratio b/a of the sides of the rectangle is determined by $K'(k)/K(k) = a/b$.

The capacitance of the lower plate 24 is given by $$C = (\epsilon_o A/g_\perp), \tag{5}$$

where A is the overlapping area and g is the gap thickness between the plate and upper adjoining walls 28, 30. An estimate of the power handling capability is obtained by estimating the power radiated at the breakdown voltage $V_c$ at the plate capacitor. The result is $$P = \tfrac{1}{2} Z_c h \left(1 + \frac{\sin 2k_o h}{2k_o h}\right) \frac{\epsilon_o V_c^2 \kappa}{\mu_o \alpha^2 \sin^2(k_o h)}, \tag{6}$$

where $Z_c$ is the surface impedance at the cavity-plasma surface, and $$\kappa = \frac{4\pi}{I_o^2} \int H_z^2\, dz. \tag{7}$$

Plasma Boundary

Here $V_c$, the rms voltage maximum at the capacitor plate, is related to the gap thickness $g_\perp$ and the breakdown field $E_\perp$ via $$E_\perp g_\perp = V_c = \omega L I_o (\sin k_o h/k_o h), \tag{8}$$

and $I_o$ is the current in the center post 22 at the top of the cavity 12. For a given machine, $Z_c$ is a weak function of plasma parameters over the normal operating range. It is assumed that $Z_c$ is a constant.

Given a value of the breakdown field, $P_{max}$ can be optimized by varying the cavity parameters. In particular, pushing the conducting rod 22 forward by making the upper cavity 12 more shallow, (i.e. decreasing $d_1$,) and increasing the opening size of side 16, by increasing the major diameter b, of rod 22 will increase the power handling capability. One can also increase the power by increasing the area of the lower plate 24, by increasing the depth D of the lower cavity 14, and simultaneously decreasing the inductance, by increasing the size of rod 22.

Figure 4:
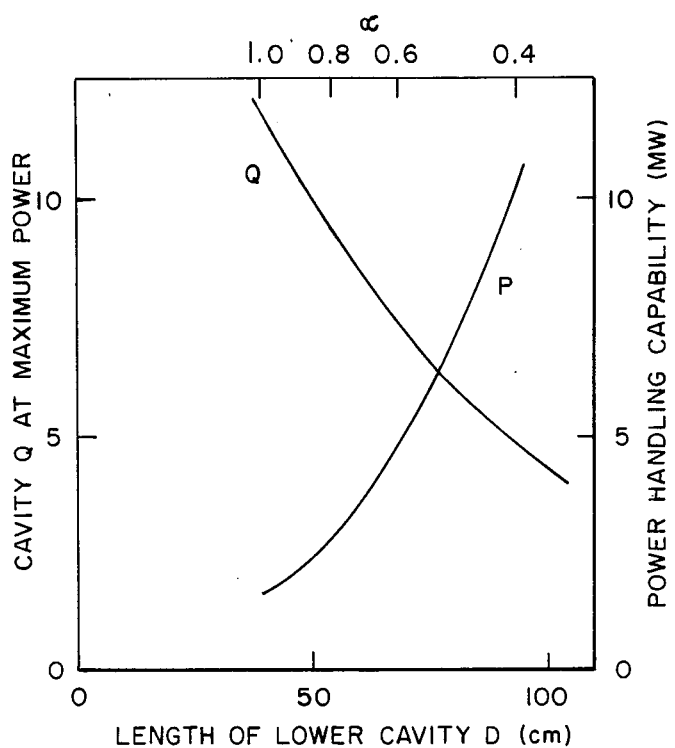
FIG. 4 is a graph indicating the relationship between cavity Q and the length of the lower cavity, with reference to the embodiment of FIGS. 1-3.

A result of such a variation for FED, the Fusion Energy Design Machine, Oak Ridge, Tenn. is shown in FIG. 4. At $D \cong 90$ cm, the power handdling capability reaches 10 MW with a very modest assumption (4 kV/cm peak) on the breakdown field. The French tokamak device, TFR, has operated antennas with electric fields in the toroidal direction (the worst case) of more than an order of magnitude larger than this. The Q is around 5, large enough not to drastically affect mode structure.

Loop coupling of cavity 10 is preferred, as the impedance seen at the transmission line feedthrough is much smaller than that of a directly connected loop. The voltage at the feedthrough will thus be much smaller unless the feedthrough in the loop case is recessed to a low voltage point (a procedure that is at best awkward in experimental situations). The high voltage region then, for cavity 10 is at the rear edge 34 of plate 24.

A theoretical analysis was made of the sensitivity of the cavity system to changes in plasma conditions. Coupling was found to be good over a wide range of plasma densities. The most sensitive parameter is found to be a shift in the location of the plasma boundary, defined here as a zero-density point. A shift in this boundary of about 2–3 cm, for fast Alfven wave launches, is tolerable.

Figure 6:
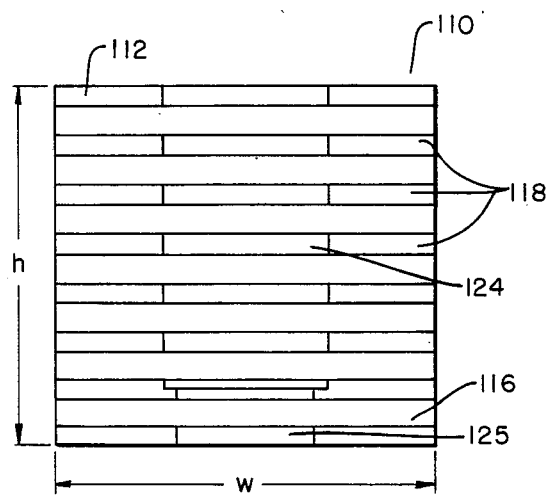
FIGS. 5-7 are side elevational, front elevational and plan views of a resonant cavity structure according to the invention having vertical plate capacitors.
Figure 7:
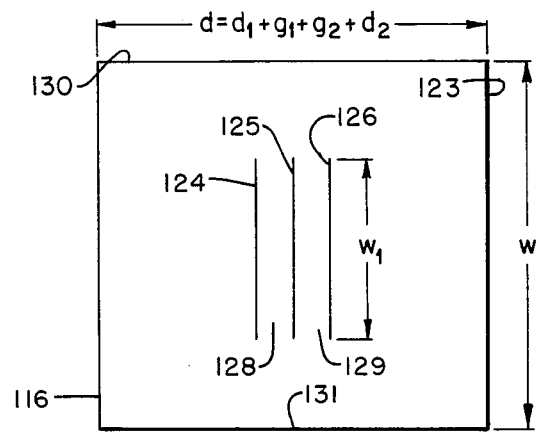

The above discussion is directed to a first embodiment of the present invention, a resonant cavity with a horizontal plate capacitor. Another embodiment, that of a resonant cavity with vertical plate capacitors, will now be explained with reference to FIGS. 5–7. A second resonant coil cavity 110 comprises a single resonant chamber 112 having a front wall 116 facing the plasma, and an opposing back wall 123. Cavity 110 includes three vertical plates: plates 124, 126 are suspended from the ceiling of chamber 112, and an intermediate plate 125, is mounted to the floor of chamber 112. The foremost plate 124 is spaced a distance $d_1$ from front side 116 of chamber 112, while the rear-most plate 126 is spaced a distance $d_2$ from rear wall 123. Gaps 128, 129 formed between plates 124, 125 and 125, 126, have dimensions $g_1$ and $g_2$ respectively. Chamber 112 has an overall height of dimension h, and a width of W. As can be seen in FIG. 7, plates 124–126 do not extend the full distance W between sidewalls 130–131 of chamber 112, but rather have a shorter width $W_1$ and are conveniently equally spaced from sidewalls 130, 131. Horizontally oriented apertures 118 formed in front wall 116 conveniently form Faraday shields having wave polarization properties which are desirable in some applications.

Figure 5:
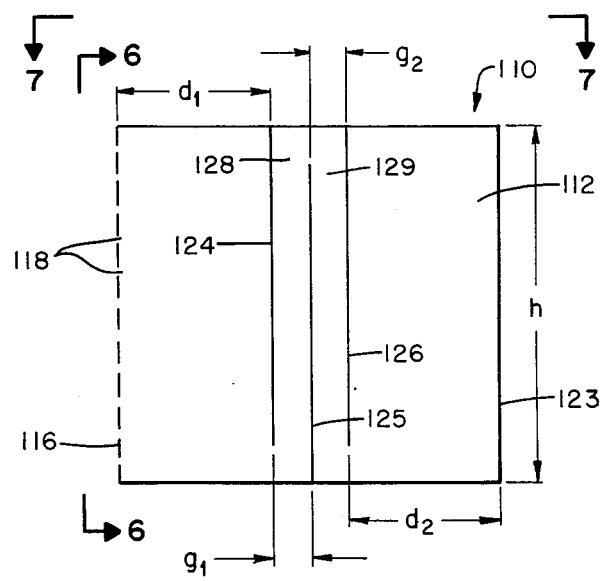

Plates 124–126 also function as frequency-determining inductive members since currents travel along the vertically oriented length of these members. As in the first embodiment 10, this cavity 110 has its foremost circuit member, plate 124, spaced a short distance from the front wall of the cavity. This distance, labelled d, in FIG. 5, is less than a quarter wavelength.

Figure 8:
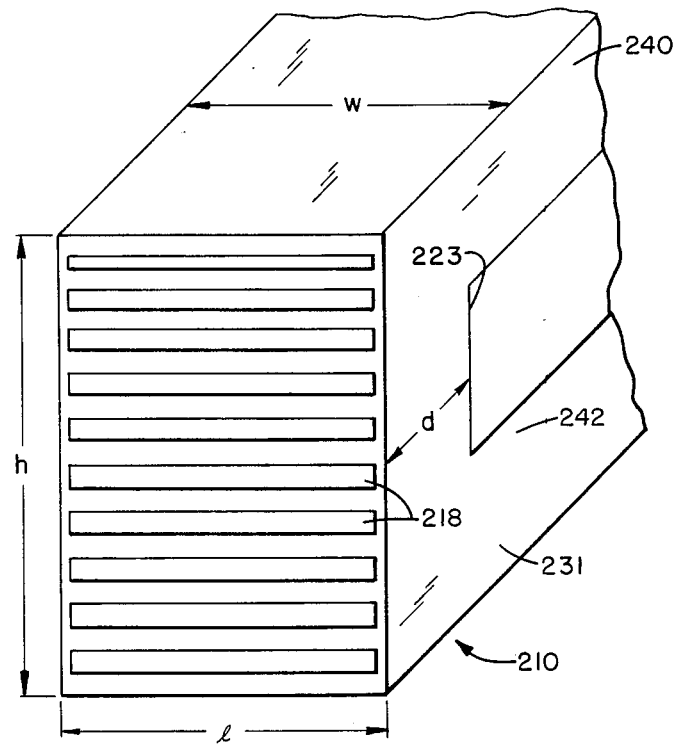
FIGS. 8-10 are perspective, plan view, and side elevational view of a variation of the embodiment of FIGS. 5-7.
Figure 9:
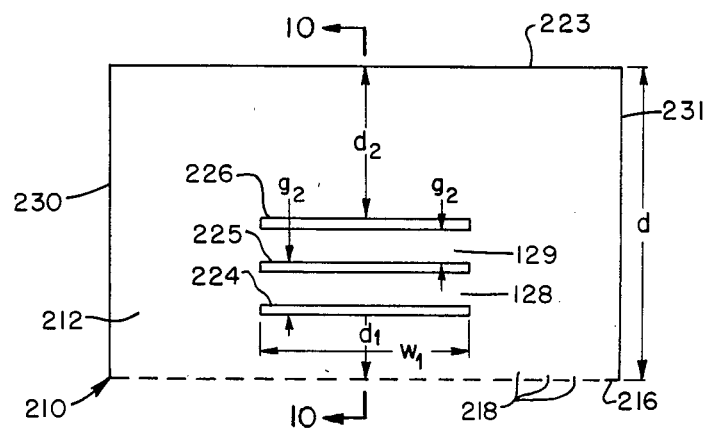
Figure 10:
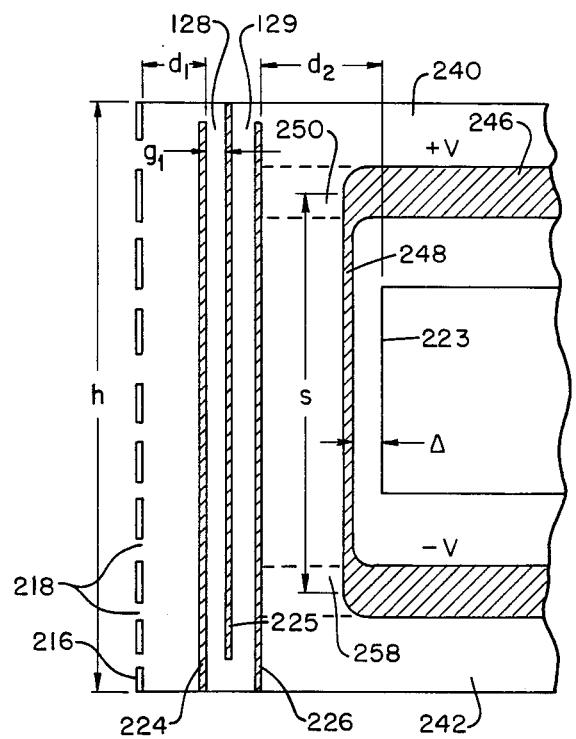

The following is a description of a variation of cavity 110, which was designed for the "Big Dee" Doublet III tokamak to be located at G.A. Technologies, Inc., San Diego. Referring now to FIGS. 8-14 a resonant coil cavity 210 comprises a single chamber 212 having a front wall 216 and a rear wall 223. Apertures 218 in front wall 216 form an optional Faraday shield, used when wave polarization is desired. Cavity 210 is of the vertical-plate type, wherein vertically-oriented plates 224, 226 are mounted to the floor of chamber 212, and intermediate plate 225 is supended from the ceiling of chamber 212. Plates 224–226 form a lumped capacitor/current rod-inductor, frequency-determining reactive circuit elements. Foremost plate 224 is spaced a distance $d_1$ (less than one-quarter wavelength) from front wall 216, and rearmost plate 226 is spaced a distance $d_2$ from rear wall 223. As can be seen in FIGS. 8, 10, rear wall 223 is not continuous from the top to bottom of cavity 212. This feature reflects the joinder of upper and lower waveguides 240, 242 to the rear wall of cavity 212. A central coaxial conductor 246 forms a cavity coupling loop 248 which energizes cavity 210. As will be appreciated by those skilled in the art, the present invention could alternatively include a central conductor 246 which is joined to the upper and lower portions of plate 226, as indicated by conductor extensions 250, 252, shown in phantom lines in FIG. 10.

Returning now to the embodiment wherein central conductor 246 forms a coupling loop with cavity 210, a resonant coupling member with improved power handling capacity will be described. The ICRF cavity-coupler for the Big-Dee machine is of a relatively small size, 35 cm width (extending in the toroidal direction) and a 50 cm height (measured in the poloidal direction). A single all metal coupler can launch 20 megawatts of fast Alfven waves, with a corresponding power density of 10 kilowatts/cm$^2$.

The two bottom plates 224, 226 are movable, so that the gap spacing $g=g_1=g_2$ can be varied to tune the cavity. The capacitance of cavity 210 is $$C = 2\epsilon_o(wh/g). \quad (9)$$

The inductance of the cavity can be determined from two dimensional vector potential calculations which yield the inductance-per-unit-length. The key parameter here is the distance $\delta$ between the Faraday Screen and the plasma surface where, to a first approximation, the tangential electric field of the plasma vanishes. As will be shown below, that the surface impedance of the plasma is low, permitting the plasma boundary 260 (see FIGS. 12, 14) to be modelled as a perfect conductor for the purposes of computing the cavity inductance. The inductance calculation is based on a two-dimensional approximation where the r.f. magnetic field $\vec{H}$ is given by $$\vec{H} = \vec{\nabla}\phi \times \hat{y} \quad (10)$$

and the r.f. flux function (vector potential) $\phi$ satisfies $$\nabla^2 \phi = 0$$

with the boundary conditions being $\phi=\phi_o$ on the central conductor and $\phi=0$ on the outside boundary. The inductance-per-unit-length is then $$(\delta L/\delta y) = \mu_o \alpha \quad (11)$$

where $$\alpha = (\phi_o/\angle dl(\delta\phi/\delta n)) \quad (12)$$

and the line integral encloses the central conductor arrangement (comprised of plates 224–226). The cavity inductance is simply $$L = \mu_o \alpha h \quad (13)$$

leading to a resonant frequency given by $$\omega_o^2 = (1/LC) = (c^2/2h^2\alpha)(g/w). \quad (14)$$

Clearly, the cavity resonant frequency depends on the plasma boundary distance $\delta$ through its effect on $\alpha$. The sensitivity through three models for $\delta$ have been investigated, and will be described in the reference to FIGS. 11–13, which are schematic diagrams employed in a theoretical analysis of the resonant cavity 210. The results of these computations are reported in Table I, based on the geometrical cavity values of Table II.

TABLE I

Resonant Cavity Parameters

| Distance to Plasma Boundary $\delta$ (cm) | $d_1$ (cm) | $\alpha$ | g (cm) |
|---|---|---|---|
| 10 | 15 | .164 | 1.88 |
| 5 | 10 | .152 | 1.74 |
| 0 | 5 | .121 | 1.39 |

TABLE II

Cavity Parameters for the Big-Dee Doublet III $\nu$ = 60 MHz = 2nd harmonic proton gyrofrequency at 2T.
h = 50 cm = poloidal cavity height
l = 35 cm = toroidal cavity length
$w_1$ = 15 cm = width of center conductor arrangement (elements 224–226)
$d_2$ = 10 cm = center conductor - backwall spacing
a = 70 cm = plasma minor radius
t = 6 cm = overall thickness of center conductor arrangement elements (224–226)
z = 17 cm = width of coaxial conductor 246
s = 35 cm = length of cavity coupling loop 248
$\Delta$ = 0–8 cm = adjustable distance between cavity coupling loop 248 and cavity backwall 223

For the 60 MHz resonant frequency desired for second harmonic proton heating in Doublet III, for example (see L. G. Davis and J. M. Rawls, "Modification of Doublet III to a Large Dee Facility," Proceedings of Ninth Symposium on Engineering Problems in Research (IEEE, New York, 1981), Vol. II, pp 1939–1942); and the dimensions of Tables I and II, Eq. 14 can be cast as $$g = (2.3 \text{ cm}) \left(\frac{\alpha}{0.2}\right) \left(\frac{\nu_o}{60 \text{ MHz}}\right)^2 \quad (15)$$

We see that gap spacings ($g=g_1=g_2$) between 1-2 cm are sufficient for tuning the cavity to accommodate various plasma-boundary positions.

The principal simplifying feature of the cavity—plasma interaction is the low value of the plasma surface impedance, valid when the parallel wavelength of the impressed $H_z$ field is sufficiently long. The result for a linear density profile (As described in the Bulletin of American Physical Society, 26, 929 (1981), is $$\frac{E_y}{H_z} = Z_p = \left(\frac{e^{-i\pi/6}}{.727}\right)\eta_o\left(\frac{a\,\Omega^2\,\omega}{2\,\omega_{pio}^2\,c}\right)^{\frac{1}{3}} \quad (16)$$

The value for typical Big-Dee Parameters is $$\frac{Z_p}{\eta_o} = \xi_p = (0.042 - i0.024)\left(\frac{10^{14}\,\text{cm}^{-3}}{n_o}\right)^{\frac{1}{3}}\left(\frac{B_T}{2T}\right) \quad (17)$$

These simple results are based on a model where fast waves propagate away from the antenna and into a linear density gradient, and hold where the parallel wavelength satisfies the inequality $$\lambda_{||} > \lambda_o = \left[\frac{2\pi\,ac^2}{v_{pio}^2}\right]^{\frac{1}{3}} = 44\,\text{cm}\left(\frac{10^{14}\,\text{cm}^{-3}}{n_o}\right)^{\frac{1}{6}}. \quad (18)$$

The results reported below show that most of the power spectrum lies at wavelengths exceeding $\lambda_{||}=70$ cm so that this condition is satisfied.

The plasma surface impedance was determined by a model which used outgoing wave boundary conditions. This is an accurate representation, provided not much wave energy is reflected back to the region of the antenna. Many second harmonic heating calculations should have significant single-pass absorption for the fast Alfven wave, thereby justifying the outgoing wave boundary conditions. For fast-wave current drive where the single-pass absorption is expected to be weak, the plasma surface impedance must be reexamined.

Figure 11:
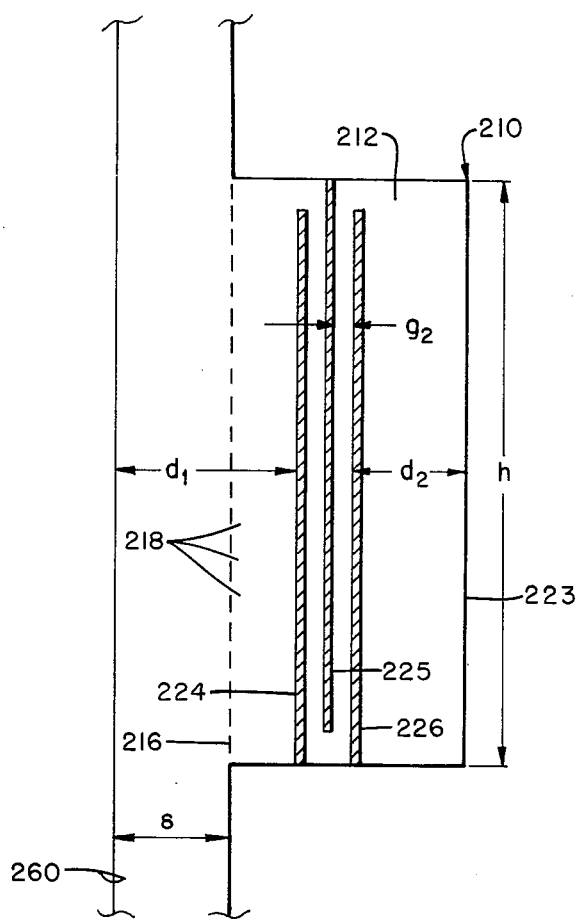
FIGS. 11-13 are schematic diagrams of a vertical plate capacitor arrangement according to the present invention, used in the theoretical development of resonant cavity design guidelines.
Figure 12:
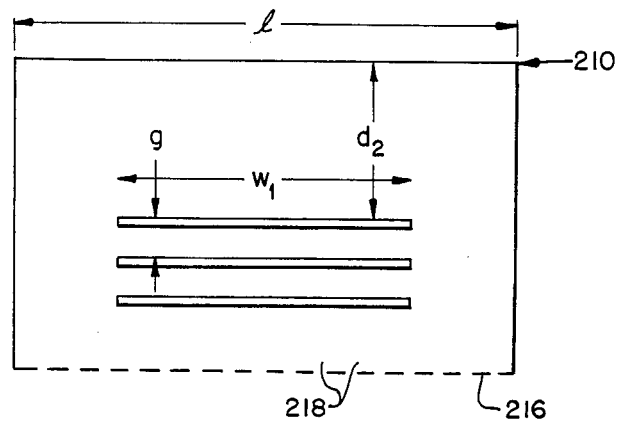
Figure 13:
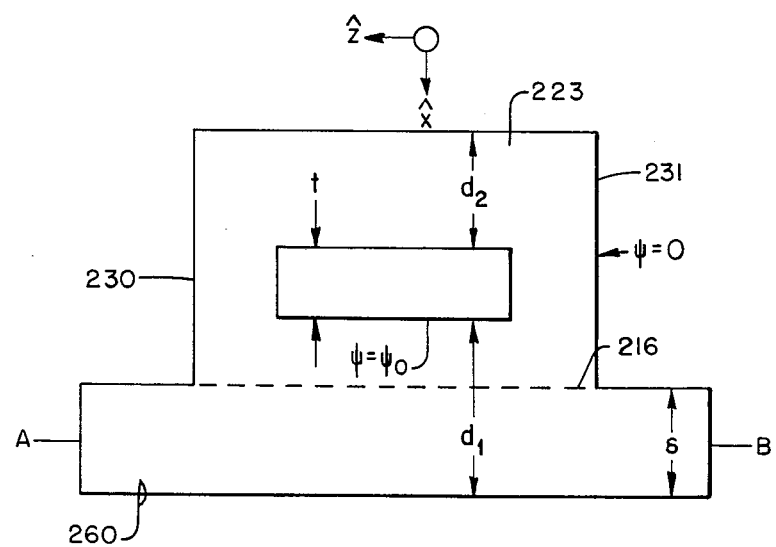

The low value of the surface impedance means that the radiation from the cavity can be computed via usual skin effect procedures. First, the plasma surface can be regarded as a good conductor from the point-of-view of calculating the cavity inductance. This step has already been taken in the calculations reported in Table I. Secondly, the power radiation by cavity 210 can be computed via $$P = \eta_o h Re(\xi_p)\int_L H_z^2 dz \quad (19)$$

where the integral is along the plasma boundary 260 of FIG. 11. The numerical inductance calculations have also computed the non-dimensional quantity $\Lambda$ $$\Lambda = \frac{2l}{\phi_o^2}\int_L\left(\frac{\partial\phi}{\partial x}\right)^2 dz = \frac{2l\,\mu_o^2 h^2}{\phi^2}\partial_L H_z^2 dz \quad (20)$$

where $$\phi = \mu_o a h I \quad (21)$$

is the oscillating rf flux. The total stored energy is $$U = \phi I. \quad (22)$$

Combining (19)-(22), one can obtain the following expressions for Q $$Q = \frac{2l\omega}{c\Lambda\alpha Re(\xi_p)} = \left(\frac{21}{\alpha\Lambda}\right)\left(\frac{l}{35\,\text{cm}}\right)\left(\frac{n_o}{10^{14}\,\text{cm}^{-3}}\right)^{\frac{1}{3}}. \quad (23)$$

Table III presents the results.

TABLE III

Cavity Q, Resistances.

| δ (cm) | $d_1$ (cm) | α | λ | Q | $R_{||}$ (Ω) | $R_s$ (Ω) |
|---|---|---|---|---|---|---|
| 10 | 15 | .164 | 3.78 | 34 | 1305 | 1.15 |
| 5 | 10 | .152 | 10.74 | 13 | 460 | 2.80 |
| 0 | 5 | .121 | 49.52 | 3.5 | 100 | 8.20 |

It is clear that the cavity Q depends critically on the plasma coil separation $d_1$. An excellent approximation is $$Q = 13\left(\frac{d_1}{10\,\text{cm}}\right)^2\left(\frac{l}{35\,\text{cm}}\right)\left(\frac{n_o}{10^{14}\,\text{cm}^{-3}}\right)^{\frac{1}{3}}. \quad (24)$$

The increase of Q with $d_1$ result from the evanescent decoupling which occurs in the vacuum region between the Faraday shield and the plasma. More precise definitions of "vacuum" and "plasma boundary" will follow.

The rms voltage in the cavity is $$V = \omega\phi. \quad (25)$$

The relation between power and cavity voltage in terms of a parallel resistance $R_{||}$ can be expressed by $$P = (V^2/R_{||}) \quad (26)$$

where $$R_{||} = \theta_o\left(\frac{2l\,h\omega^2}{c^2}\right)\frac{1}{\Lambda Re(\xi_p)} \quad (27)$$

$$R_{||} = (4935\,\Omega)\frac{1}{\Lambda}\left(\frac{n_o}{10^{14}\,\text{cm}^{-3}}\right)^{\frac{1}{3}}\left(\frac{B_T}{2T}\right). \quad (28)$$

The loading for ICRF antennas has customarily been expressed in terms of a series resistance $R_s$ which is defined by $$P = R_s I^2 \quad (29)$$

where I is the current flowing in the cavity. Equations (19)-(21) combine to give $$R_s = \frac{\Lambda\alpha^2 Re(\xi_p)h}{2l}\eta_o \quad (30)$$

$$= (11.3\,\Omega)\Lambda\alpha^2\left(\frac{10^{14}\,\text{cm}^{-3}}{n_o}\right)^{\frac{1}{3}}\left(\frac{B_T}{2T}\right). \quad (31)$$

Second harmonic heating has been assumed in formulas (28) and (31), so that the frequency scales linearly with the magnetic field.

The loading of the cavity is quite sensitive to the plasma-cavity separation. Moderate Q (10-30) cavities will permit us to match to transmission lines, while not requiring unacceptably large voltages.

Table III shows that with a 10-cm thick scrape-off plasma, the series resistance remains sufficiently high and the cavity-Q moderate. This thick scrape-off plasma is quite desirable in a reactor to protect the coupler from heat outflow.

Figure 14:
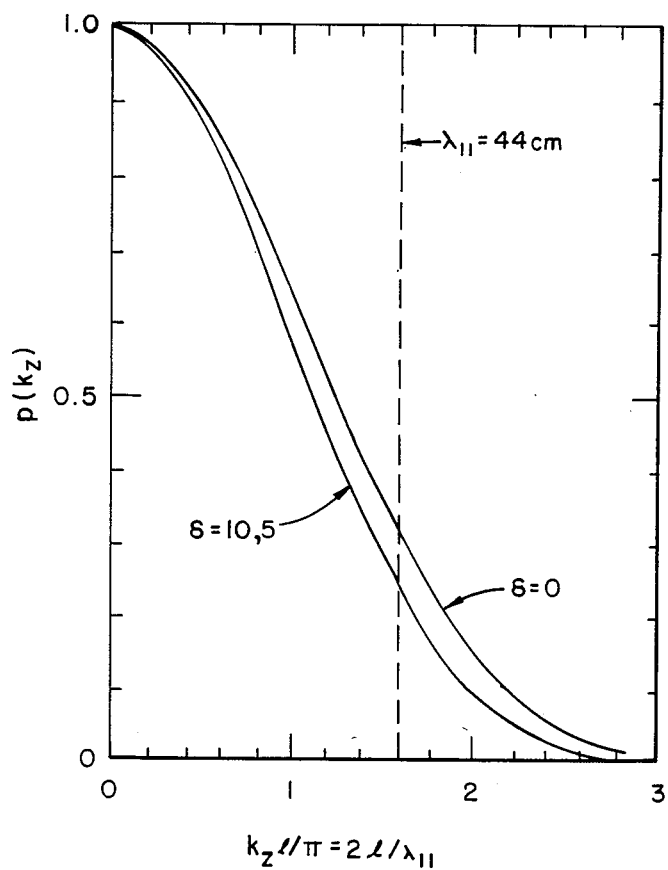
FIG. 14 presents the wave number spectrum for three cavity-plasma separations.

FIG. 14 presents the wavenumber spectrum for the three cavity-plasma separations. Clearly most of the power spectrum lies with wavelengths larger than $\lambda_{|}=44$ cm, so that inequality (18) is well satisfied.

The resonant cavity 210 is excited by magnetic loop coupling from a pair of 40 Ω transmission lines. The transmission lines 240, 242 are of relatively low impedance to permit high power capability at acceptable voltages. The rectangular geometry of lines 240, 242 [see (36)] is chosen both to result in low selfinductance for the coupling loop and to provide magnetic insulation across the smaller conductor separation at the vacuum-gas interface which is presumed to occur in a region of significant toroidal field.

Figure 15:
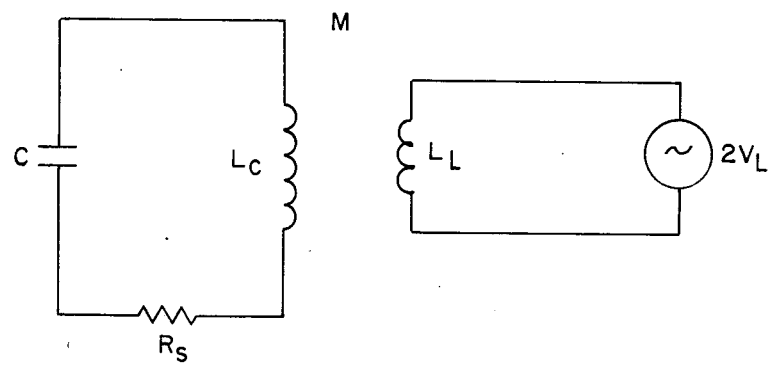
FIG. 15 is an electrical equivalent circuit for the arrangement of FIGS. 8-10.

The equivalent circuit for the matching network is shown in FIG. 15. This leads to the equations $$O = (-i\omega L_c + (i/\omega C) + R_s)I_c - i\omega M I_L \quad (32)$$

$$2V_L = -i\omega L_L I_L - i\omega M I_c \quad (33)$$

and the well-known formula $$Q \equiv (\omega L_c / R_s) = (R_{||}/\omega L_c). \quad (34)$$

Figure 2:
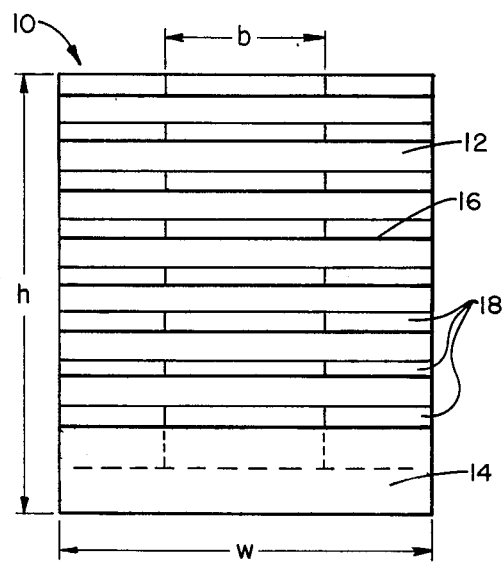

Equations (32)–(34) employ the following definitions which use the dimensions given in FIGS. 1 and 2.

$L_c = \mu_0 \alpha h$ = cavity inductance (35)

$L_L = (\mu_0 s \Delta / z)$ = self inductance coupling loop 248 (36)

$M = (4\mu_0 \alpha s \Delta / l) \sin h(\pi d_2/l)$ = mutual inductance between cavity 210 and loop 248 (37)

$C = (2\epsilon_0 w h/g)(1/\omega_0^2 L_c)$ = capacitance of cavity 210 (38)

$I_c$ = current in cavity 210
$I_L$ = current in transmission line 240, 242
$V_L$ = Voltage in a transmission line 240, 242
o = resonant frequency of cavity 210
$R_L = 40\Omega$ = impedance of transmission line 240, 242

Considering the expressions for $L_L$ and M, the self-inductance of the coupling coil 248 is simply that of a solenoid of area $s\Delta$ and length z. Formula (36) probably underestimates $L_L$ because of a contribution from volume in the transmission lines. The mutual inductance is based on the result $$B_z = \frac{4\phi}{lh \sinh(\pi d_2/l)} = \frac{4\mu_0 \alpha I_c}{l \sinh(\pi d_2/l)} = \quad (39)$$

magnetic field near backwall 223 of cavity 210 which, in turn, rests on the approximation that the cavity rf flux $\phi$ must pass through a relatively narrow gap between the central conductor and the cavity sidewall. The mutual flux $\phi_M$ coupled by the transmission line is then $$\phi_M = B_z s \Delta \equiv M I_c \quad (40)$$

from which the mutual inductance follows. It is also useful to note that $L_L = \beta M$, where $$\beta = (l/4\alpha z) \sin h(\pi d_2/l) \approx 3.4. \quad (41)$$

The matching calculation is performed by solving (32)–(33) for the ratio $$\frac{V_L}{I_L} = \frac{1}{2}\left\{ \frac{\omega M^2}{QL_c[(1-\omega_0^2/\omega^2)^2 + 1/Q^2]} - \right.$$

$$\left. i\left[\omega L_L - \frac{\omega M^2(1-\omega_0^2/\omega^2)}{L_c[(1-\omega_0^2/\omega^2)^2 + 1/Q^2]}\right]\right\} = Z_L$$

A perfect match to the transmission line requires $Z_L = R_L$. This is a complex equation which generates two matching equations $$2R_L = \frac{\omega M^2}{QL_c[(1-\omega_0^2/\omega^2)^2 + 1/Q^2]} \quad (42)$$

$$\omega L_L \equiv \omega \beta M = \frac{\omega M^2(1-\omega_0^2/\omega^2)}{L_c[(1-\omega_0^2/\omega^2)^2 + 1/Q^2]} \quad (43)$$

There are two adjustable parameters which permit these equations to be satisfied. They are $\omega_o$, the cavity resonant frequency, and $\Delta$, the distance the coupling loop penetrates into the back of cavity 210. The cavity resonant frequency is varied by changing the capacitor gaps.

Equations (42) and (43) can be manipulated to give $$\frac{\beta \omega M}{2RLQ} = \left[\frac{\beta^2 \omega L_c}{2R_L(Q - \beta^2 \omega L_c/2R_L)}\right]^{\frac{1}{2}} \frac{1}{Q} = 1 - \frac{\omega_o^2}{\omega^2} \quad (44)$$

$$M^2 = \frac{2R_L L_c}{\omega(Q - \beta^2 \omega L_c/2R_L)} \quad (45)$$

For meaningful solutions to exist, Q must be sufficiently large:

$$Q > Q_o = (\beta^2 \omega L_c/2R_L) \approx 5.1 \quad (46)$$

Combining (35), (37), (45) and (46) yields an expression for $$\frac{\Delta}{z} = \frac{2R_L}{\omega s \mu_0}\left(\frac{Q_o}{Q - Q_o}\right)^{\frac{1}{2}} = (0.50)\left(\frac{Q_o}{Q - Q_o}\right)^{\frac{1}{2}} \quad (47)$$

Cavity Q values above 20 are required to make $\Delta$ a modest fraction of $d_2$, which is implied in the configuration of FIGS. 8–11. Thus the resonant coil coupler 210 will work best when the cavity loading is not too high, i.e., when the plasma—wall separation is roughly 10 cm. Under these circumstances, a perfect match to the transmission line can be obtained and the required shift of the resonant frequency $$\frac{\Delta\omega}{\omega_o} = \frac{1}{2Q}\left(\frac{Q_o}{Q - Q_o}\right)^{\frac{1}{2}} \quad (48)$$

is very small. Clearly, the mechanical design of the coupling system will have to permit a variation in distance $\Delta$ to achieve a match to the transmission line. The range $0 < \Delta < 10$ cm should suffice.

The power handling capability of cavity 210 is governed by the electric fields that can be maintained without breakdown. There are two different criteria: the first criterion governs the electric field $E_1$ that can be sustained along the insulator at the vacuum-gas interface which occurs in the transmission lines. It is assumed that this transition takes place in a region of significant toroidal magnetic field so the relevant electric field is that between the central conductor arrangement, elements 24-16, and the side walls 230, 231 of the rectangular coaxial line. The second criterion involves the electric fields which can be withstood across a vacuum gap. There are two classes here, $E_{2\perp}$, the electric field perpendicular to the main toroidal field and $E_{2\|}$, the electric field parallel to the magnetic field.

Data for both criteria is set out in the paper "Surface Physics Problems During ICRF Heating of Tokamak Plasmas" D. Q. Hwang, A. Grotz, and J. C. Hosea, Journal of Vacuum Science and Technology 20, 1273 (1982). Their measurements for vacuum breakdown are for a magnetic-field-free case. Table IV summarizes the specified measurements and the criteria adopted for those measurements. The criteria are all significantly less than the measured values and thus should be conservative. Indeed, experience with all-metal ICRF antennas in the TFR tokamak has shown that 50 kV/cm across the toroidal field can be withstood even when the antenna is inside the vacuum vessel and immersed in the scrape-off plasma.

TABLE IV

| | Electric Field Criteria | |
|---|---|---|
| Case | Ref 2 | Criterion |
| Insulator at vacuum-gas interface | 10 kV/cm | 5 kV/cm |
| Vacuum gap across toroidal field | 120 kV/cm* | 120 kV/cm |
| Vacuum gap along toroidal field | 120 kV/cm* | 40 kV/cm |

*Measurement at zero magnetic field

It has been assumed that magnetic insulation will be sufficiently effective so that the breakdown electric field across the toroidal field is significantly higher than the reported field-free breakdown field. The power handling limitations based on these criteria are presented in Table V.

TABLE V

| | Power Handling Limitations | | | | | |
|---|---|---|---|---|---|---|
| Element | $d_1$ (cm) | gap spacing, $g_1 = g_2$ (cm) | E (kV/cm) | Voltage V (kV) | Impedance (R - Table III) ( ) | Power (Mw) |
| Single Transmission Line | NA | 9 | 5 | 45 | 40 | 50 |
| Capacitor gap across toroidal field | 15 | 1.8 | 120 | 210 | 1305 | 33 |
| | 10 | 1.7 | 120 | 200 | 460 | 85 |
| | 5 | 1.4 | 120 | 160 | 100 | 256 |
| Capacitor-side wall (along toroidal field) | 15 | 10 | 40 | 400 | 1305 | 122 |
| | 10 | 10 | 40 | 400 | 460 | 347 |
| | 5 | 10 | 40 | 400 | 100 | 1600 |

The two weak areas are the transmission lines and the capacitor gap for the largest plasma-cavity separation. Table V shows that when the Faraday screen-plasma separation is 10 cm, the resonant-coil coupler should be able to handle 20 MW with a capacitor voltage of 160 kV across a gap of 1.8 cm. While this is very close to the breakdown value reported for carefully polished electrodes in Hwang et al, above, it is conjectured that magnetic insulation will permit these electric fields to be reached. A power of 20 MW corresponds to approximately 10 kW/cm$^2$—a power density that is very attractive for heating fusion reactors.

Table VI shows the voltages and electric fields which are associated with the Doublet III coupler operated at 20 MW. The electric fields are all at or below the criteria of Table IV. In particular, the electric fields in the transmission lines are below the criteria, so that a significant reflected power could be tolerated without inducing breakdown. A power of 20 MW corresponds to a power flux of 10 kW/cm$^2$—a value that is very attractive for heating fusion plasmas.

TABLE VI

| | Voltages For 20 MW Coupler* | | | | | |
|---|---|---|---|---|---|---|
| Element | Power (MW) | Gap Spacing (cm) | R (Ω) | V (kV) | E (kV/cm) | Criterion (kV/cm) |
| Single Transmission Line | 10 | 9 | 40 | 20 | 2.2 | 5 |
| Capacitor gap (across toroidal field) | 20 | 1.8 | 395 | 90 | 50 kV/cm | 50 kV/cm |
| Capacitor-side wall along toroidal field) | 20 | 10 | 395 | 90 | 9 kV/cm | 20 kV/cm |

*δ = 10 cm, Q = 10 assumed (see Table III).

It can be seen that the excellent power handling capability of the present invention is provided by matching the transmission line to reduce voltages at the vacuum-gas interface insulator, and by orienting the strong electric fields in the capacitors to be orthogonal to the toroidal field.

The calculations based on dimensions appropriate to the "Big Dee" Doublet III tokamak can be readily repeated for TFTR or reactor installations.

Attention will now be directed toward examining some assumptions that have been made in the above calculations. First, the vacuum region of extent δ between the Faraday screen and the plasma has been assumed. The meaning of "vacuum" in this content is that condition which prevails when the plasma density is less than the cutoff density $n_c$ for fast Alfven wave propagation. For second harmonic proton heating, this density is given by $$n_c = 3.10^{12} \text{ cm}^{-3} (70 \text{ cm}/\lambda_{||})^2 \tag{49}$$

Evidently, this is not a well-defined number because of the dependence on parallel wavelength. Nonetheless, the power spectra of FIG. 15 shows that $\lambda_{||} = 70$ cm is a representative number. Therefore the plasma boundary can be considered as that region at which $n = n_c$.

In many formulas, the quantity $\omega_{pio}^2/2a$ is present. This is merely a convenient way of estimating the plasma density. gradient in the region where $n \approx n_c$. A more precise expression should have $$\frac{\omega_{pio}^2}{2a} = \left\langle \frac{d\omega_{pi}^2}{dx} \right\rangle \ n = n_c \tag{50}$$

where the $<>$ bracket denotes a representative value over a region of extent $$\Delta r \sim \left( \frac{c^2}{d\omega_{pi}^2/dx} \right)^{\frac{1}{3}} \approx \left( \frac{c^2 a}{2\omega_{pio}^2} \right)^{\frac{1}{3}} \sim 5 \text{ cm} \tag{51}$$

about the place where $n = n_c$.

The plasma surface impedance was determined by a model which used outgoing wave boundary conditions. This is an accurate representation provided not much wave energy is reflected back to the region of the antenna. Many second harmonic heating calculations should have significant single-pass absorption for the fast Alfven wave, thereby justifying the outgoing wave boundary conditions. For fast-wave current drive where the single-pass absorption is expected to be weak, the plasma surface impedance must be re-examined.

Figure 16:
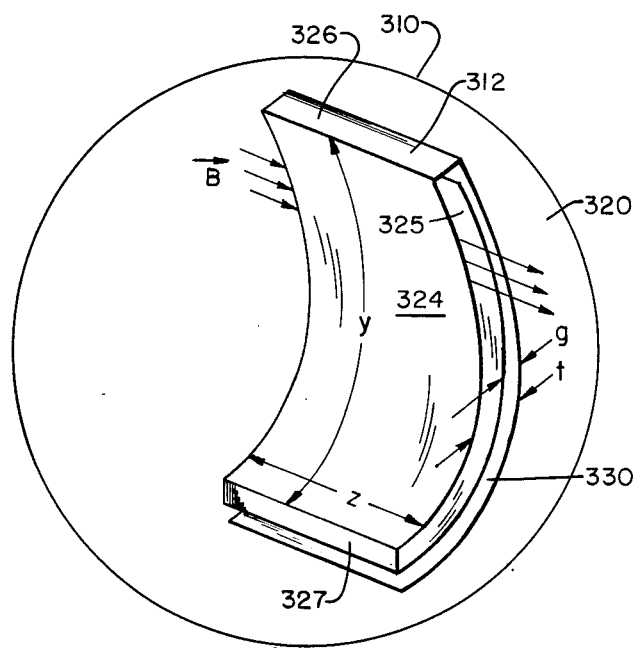
FIG. 16 is a perspective view of an alternative embodiment of the present invention shown mounted within a plasma chamber.

While the above discussion has been limited to vertical-plate and horizontal-plate configurations, the present invention also provides arrangements in which the plate capacitor elements may assume whatever shape best conforms to the physical limitations of the environment. For example, a resonant coil cavity is shown in FIG. 16, in which the capacitor plate arrangement is concave, rather than a flat-plane configuration. Referring to FIG. 16, a resonant coil cavity 310 includes an assembly 312 mounted inside a plasma chamber 320, such as the first wall of a tokamak or the like device wherein a plasma is immersed in a strong magnetic field. If the plasma chamber is indeed part of a tokamak device, the strong magnetic field referred to is a toroidal magnetic confinement field. Assembly 312 includes two thin metal sheets or plates 324, 325 which are mounted so as to be uniformly spaced apart from each other and from the plasma chamber. End wall 326 is mounted to plasma chamber 20, to support inner plate 324, which is joined thereto at its upper end. A second end wall, radially oriented wall 327, is joined to the lower end of inner wall 324. The lower end of radially outer wall 325 is joined to end wall 327 so as to receive support therefrom. Thus walls 324-327 are joined together to form a single continuous wound conductor which exhibits both inductive and capacitive reactance.

Reference numeral 330 is applied to that portion of plasma chamber 320 overlaid by plates 324, 325. If desired for ease of construction, numeral 330 can be considered a third plate, similar to plates 324, 325 which is joined to plasma chamber 320 so as to be substantially identical thereto, in an electrical sense. In either event, plate 325 is uniformly spaced from member 330 by a gap of dimension g, and forms a capacitor member therewith which is needed for L-C resonance.

Figure 17:
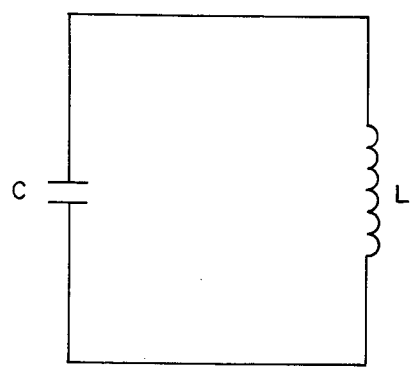
FIG. 17 is a schematic diagram of an equivalent circuit of the embodiment of FIG. 16.

Arrangement 312 provides a high-Q resonator internal to the vacuum vessel from which sets up a magnetic field having a strong toroidal component which couples well to the fast Alfven wave. Coupler 310, which is much smaller than the usual half-wavelength size, finds immediate application in tokamaks with limited ports and access, to impress an oscillating magnetic field with a strong toroidal component on the plasma. The strong electric fields associated with the high-Q circuit of coupler 310 are directed orthogonal to the main toroidal magnetic field, thereby achieving an important magnetic insulation effect. Standard techniques of analyzing microwave resonators show that cavity 310 can be regarded as an equivalent LC circuit (see FIG. 17), where the capacitance is concentrated in the narrow gap region g and the inductance is that of a solenoid with an oscillating magnetic field in the toroidal direction $$C = (\epsilon_0 yz/g) L = (\mu_0 y(t-g)/z) \tag{52}$$

The resonant frequency is $$\omega^2 = \frac{1}{LC} = \frac{c^2 g}{y^2(t-g)}$$

or $$\nu = \left( \frac{c}{2y} \right) \frac{1}{\pi} \left( \frac{g}{t-g} \right)^{\frac{1}{2}}$$

In a typical tokamak application, representative dimensions include:
y = extent in poloidal direction = 40 cm
z = extent in toroidal direction = 20 cm
g = gap spacing = 1 cm
t = thickness = 5 cm These numbers yield $\nu = 60$ MHz, a frequency in the ICRF frequency range.

A principal advantage of this resonator over a conventional slotted cavity resonator is that it is much shorter in the poloidal (y) direction. The ratio is $$\frac{\text{proposed resonator } y}{\text{conventional cavity } y} = \frac{1}{\pi} \left[ \frac{g}{t-g} \right]^{\frac{1}{2}} \approx \frac{1}{6}\pi$$

leading to a size reduction of approximately a factor-of-six. Similarly, since the resonant frequency is independent of z, the resonator can be much shorter than a half-wavelength in the toroidal direction.

Within the resonator, the oscillating magnetic field is in the toroidal direction and sticks out the ends. This field must loop out into the plasma providing an excitation of compressional waves much like a coil of toroidal extent z. It should be noted that the electric fields in the resonator are perpendicular to the main toroidal field. The structure can obviously be of all-metal construction.

Figure 18:
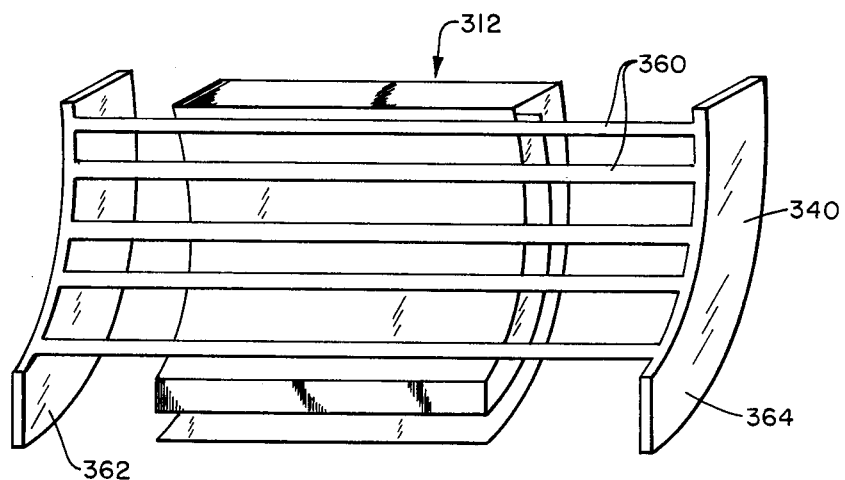
FIG. 18 is a perspective view of the arrangement of FIG. 16, with a Faraday shield added.

If a Faraday shield is required for use with coupler 310, it must extend over the entire length of the cavity. The constraint on a Faraday shield is that no net flux emerge through a Faraday shield slot. Thus one cannot construct Faraday shields for the two ends of the resonator. FIG. 18 shows a Faraday shield 340 comprising elongated spaced-apart strips 360 joined at their ends to end walls 362, 364. The Faraday shield is arranged so as to overlie the resonant coil cavity assembly 312.

Cavity 310 is energized by coupling a single transmission line to plate 325, using conventional techniques, preferably an electrostatic capacitive coupling arrangement.

If loop coupling is otherwise required, the arrangement of FIG. 16 must be modified by exchanging positions of plates 324, 325 such that the capacitive gap region (plate 325) of the resonator is closer to the plasma, and the inductive solenoid region (plate 324) is closer to the wall of chamber 320. Viewed from this perspective, the resonator is simply a high-Q device to match the impedance of the feed. Its Q will be determined by the radiaton of compressional waves. Its principal advantages over a coil are its toroidal length which ensues good penetration of wave fields into the plasma, and the fact that the strong electric fields are perpendicular to the toroidal field, thereby diminishing electrical breakdown problems.

Thus it can be seen that the present invention provides a resonant coil cavity of reduced size (substantially smaller than the conventional one-half vacuum wavelength antennae) whose design provides the following advantages: (1) it is an all-metal, modular design, utilizing a large area Faraday screen, and does not protrude beyond the vacuum vessel wall; (2) the rf magnetic field orientation is similar to coil couplers and effectively radiates fast Alfven waves; (3) the strong electric fields associated with the reactive energy are contained entirely within the cavity, and oriented perpendicular to the main toroidal field, thereby benefitting from magnetic insulation; and (4) the vacuum interfaces are located in a pair of 40Ω rectangular coaxial transmission lines which are matched to the cavity and carry only forward power. Features (3) and (4) provide an excellent power handling capability. A single resonant cavity coupler, for example, should be able to introduce 20 MW of ICRF power into Doublet III, with electrical fields significantly below measured breakdown levels. This corresponds to a power density of 10 kW/cm$^2$—a density entirely adequate for reactor applications. Thus the present invention provides a more compact launching arrangement (all outside dimensions less than one-quarter wavelength) that operates at substantially higher power flux levels than previous antenna designs, without exceeding conservative electric field criteria.

Arrangements of varying plate configurations have been shown, and this invention contains plates, and plate capacitors that may take on whatever shape is required to best conform to the physical limitations of the environment. To take advantage of magnetic insulation in the small gap, however, the surface of the capacitor plate members must be roughly tangential to a strong direct current magnetic field.

In toroidal magnetic confinement systems, this field will be the toroidal magnetic field. The current rod or inductive members must be oriented perpendicular to the direction of the magnetic field in order to launch desirable Alfven waves. The present invention, when adapted to toroidal devices, provides a high Q resonator which launches a magnetic field that has a strong toroidal component that couples well to the energizing fast Alfven wave. Thus the present invention impresses an oscillating magnetic field with a strong toroidal component on the confined plasma, with strong electric fields associated with the reactive energy of the high-Q circuit being contained entirely within the cavity, and oriented orthogonal to the main toroidal magnetic field.

It will be understood by those skilled in the art, that the aforementioned Faraday screens are not required to practice the present invention. The Faraday screens however are useful in many plasma confinement devices, to form a barrier between the plasma and the resonant cavity, but more importantly, to provide wave polarization needed for effective energy coupling for particular plasma configurations. Power will be transmitted through a large area Faraday screen. The large area Faraday screen not only shields out coupling to surface electrostatic modes, but also prevents plasma particles and radiation from entering the resonant cavity. In addition, it permits toroidal currents to flow uninterrupted in the vacuum vessel wall, and thus does not degrade the passive stabilization properties of the vacuum vessel.

The resonant-cavity of the present invention is all metal, and of a modular nature which can be simply bolted onto a rectangular port opening. The insulators associated with the vacuum gas transition in the coaxial transmission could be located behind neutron shielding. Altogether, the resonant cavity coupler of the present invention finds ready application in a reactor environment. It will be readily appreciated by those skilled in the art, the wave launcher of the present invention contains properties of both coil-type and waveguide types of wave launchers, since the characteristics of waves launched by the present invention depend not only the wave launcher structure, but also upon the properties of the coil, or inductive member employed in the present invention. Coupling to the plasma load is determined by current flowing through the coil, i.e., inductive component. The present invention provided these features in a non-intrusive structure whose outside dimensions are all less than one-quarter wavelength of the waver launched.

The embodiment of the invention in which an exclusive property or privilege is claimed are defined as follows:

1. In a magnetic confinement plasma device having a plasma, said plasma being immersed in a strong magnetic field and confined within an evacuated plasma chamber, a wave launcher for launching electromagnetic waves in the range of frequencies of 10 MHz to 200 MHz to energize and thereby heat said plasma, said wave launcher being spaced-apart from said plasma, said wave launcher comprising:

a resonant cavity, said resonant cavity including resonant chamber walls for containing electromagnetic fields;

connection means for connecting said resonant cavity to a transmission line carrying electromagnetic wave energy to said resonant cavity;

at least one capacitive reactive element, and at least one inductive reactive element disposed within said resonant cavity and spaced no farther from said plasma chamber than one-quarter wavelength of said frequency of said launched waves, said capacitive and said inductive reactive elements cooperating at least partially determined said frequency of said launched waves;

said capacitive reactive member separated from said chamber walls of said resonant cavity by a first predefined gap, with said capacitive reactive member and said chamber walls of said resonant cavity oriented approximately tangential to said strong magnetic field;

said capacitive and said inductive reactive elements spaced apart from said plasma a second predetermined distance which at least partially determines said frequency of said launched waves; and said resonant cavity cooperating with said capacitive and said inductive reactive elements so as to launch electromagnetic waves in said range of frequencies, toward said plasma.

2. The arrangement of claim 1 wherein said electromagnetic fields of said cavity are oriented so as to effectively radiate Alfven waves toward said plasma.

3. The arrangement of claim 2 wherein energy radiated by said cavity to said plasma is within the ion cyclotron range of frequencies of said plasma, such that energy is transferred to plasma resonances.

4. The arrangement of claim 3 further comprising a Faraday shield interposed between said plasma and said reactive elements.

5. The arrangement of claim 4 wherein said plasma chamber comprises the first wall of a toroidal magnetic confinement device and said strong magnetic field comprises a toroidal magnetic confinement field of said device.

6. The arrangement of claim 4 wherein at least one of said capacitive and said inductive reactive members comprises at least one sheet-like plate member having two opposed surfaces with one surface located adjacent said cavity.

7. The arrangement of claim 6 wherein substantially the entire extent of said one sheet-like plate member is uniformly displaced from said resonant cavity so as to form said first predefined gap.

8. The arrangement of claim 7 wherein:

said resonant cavity further includes a first chamber having a first end wall, and a second chamber joined to said first chamber at a common wall common to both chambers;

said inductive member has first and second ends, with said first end joined to said first end wall, and a second end portion penetrating through said common wall to said second member;

said capacitive member is joined to said second end of said inductive member, said capacitive member lying entirely within said second chamber, wherein said first gap is formed between said capacitive member and said common wall.

9. The arrangement of claim 8 wherein said capacitive member comprises a sheet-like plate.

10. The arrangement of claim 9 wherein said inductive member comprises an elongated conductor having a second end joined at right angles to said capacitive member.

11. The arrangement of claim 10 wherein said first chamber further includes a first sidewall having an opening facing said plasma through which said waves are radiated toward said plasma.

12. The arrangement of claim 11 wherein said first chamber further includes a second sidewall opposing said first sidewall, with said wave launcher connection means located immediately adjacent thereto.

13. The arrangement of claim 12 wherein said second chamber overlies said second sidewall, said second chamber being elongated in a direction generally orthogonal to said second sidewall.

14. The arrangement of claim 13 wherein said Faraday shield is disposed in said opening of said first sidewall, and said second gap is formed between said plasma and said Faraday shield.

15. The arrangement of claim 14 wherein said plasma cavity is secured to said plasma chamber, said plasma chamber having an opening which is aligned in registry with said opening of said first chamber so as to facilitate the communication of said waves from said resonant cavity to said plasma.

16. The arrangement of claim 15 wherein said plasma chamber comprises a first wall of a toroidal magnetic confinement device, and said strong magnetic field comprises a toroidal magnetic confinement field of said device.

17. The arrangement of claim 7 wherein: said resonant cavity further includes a first chamber having first and second opposed end walls, and said inductive and capacitive reactive members include first and second conductor members joined to said first and said second end walls, respectively.

18. The arrangement of claim 17 wherein said first and said second conductor members at least partially overlie each other so as to form said first predetermined gap.

19. The arrangement of claim 18 further including a third conductive member joined to said first end wall and at least partially overlying said second conductive members so as to form a third predetermined gap therewith.

20. The arrangement of claim 19 wherein said first and said third conductive members comprise elongated conductive strips joined at first ends to said first end wall.

21. The arrangement of claim 20 wherein said second conductive member comprises an elongated conductive strip joined at a first end to said second end wall.

22. The arrangement of claim 21 wherein said resonant cavity comprises a first sidewall having an opening communicating with said plasma, through which said waves are transmitted to said plasma.

23. The arrangement of claim 22 wherein said first sidewall extends generally parallel to said first conductive member, said first conductive member being the closest conductive member to said first sidewall.

24. The arrangement of claim 23 further including a Faraday screen disposed in said opening for polarizing said launched waves, said second gap formed between said plasma and said Faraday shield.

25. The arrangement of claim 24 wherein said plasma chamber comprises a first wall of a toroidal magnetic confinement device, and said strong magnetic field comprises a toroidal magnetic field of said device.

26. The arrangement of claim 7 wherein said cavity comprises a portion of a first wall of a toroidal magnetic confinement device, said inductive and said capacitive reactive components comprise first and second sheet-like plate members equally spaced apart from each other and having first and second ends, said cavity further comprising first and second end walls, with said first end wall joined to said first wall of said toroidal device and to said first end of said first sheet-like plate member, said second end wall joined to said second ends of said first and said second plate members, said second plate member immediately adjacent to, and equally spaced from, said first wall of said toroidal device so as to form said first gap therewith, said second gap formed between said plasma and said first plate member.

27. The arrangement of claim 26 wherein said connection means comprises an electrostatic capacitive coupling to said first plate member.

28. The arrangement of claim 27 wherein said Faraday shield comprises toroidally oriented elongated conductor strips overlying said second plate member, and joined at first and second ends to first and second support walls joined to said first wall of said toroidal device.

* * * * *